(12) United States Patent
Gould et al.

(10) Patent No.: US 10,769,122 B2
(45) Date of Patent: Sep. 8, 2020

(54) SPECIFYING AND APPLYING LOGICAL VALIDATION RULES TO DATA

(71) Applicant: Ab Initio Technology LLC, Lexington, MA (US)

(72) Inventors: Joel Gould, Arlington, MA (US); Roy Procops, Winchester, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 14/208,147

(22) Filed: Mar. 13, 2014

(65) Prior Publication Data

US 2015/0261796 A1    Sep. 17, 2015

(51) Int. Cl.
*G06F 17/00* (2019.01)
*G06F 16/215* (2019.01)
*G06Q 10/06* (2012.01)

(52) U.S. Cl.
CPC ......... *G06F 16/215* (2019.01); *G06Q 10/067* (2013.01)

(58) Field of Classification Search
CPC .. G06F 17/2247; G06F 17/246; G06F 17/248; G06F 17/2725; G06F 17/30067; G06F 17/30286; G06F 17/30289; G06F 17/30595; G06F 17/30303; G06F 16/215; G06F 8/10; G06Q 10/067; G06Q 10/06
USPC ....... 707/687, 694, 701, 702, 763, 790, 793, 707/795, 803, 804, 805, 810; 717/100, 717/123, 126; 715/212, 216, 219, 687, 715/694, 701, 702, 763, 790, 793, 795, 715/803, 804, 805, 810
See application file for complete search history.

(56) References Cited

U.S. PATENT DOCUMENTS

| | | | | |
|---|---|---|---|---|
| 5,446,885 | A  * | 8/1995 | Moore | G06Q 40/08 |
| 6,535,883 | B1 * | 3/2003 | Lee | G06F 9/44 |
| | | | | 707/694 |
| 8,069,129 | B2 | 11/2011 | Gould et al. | |
| 8,099,441 | B2 * | 1/2012 | Surasinghe | G06F 8/70 |
| | | | | 707/790 |
| 8,473,910 | B2 * | 6/2013 | Skriletz | G06F 8/20 |
| | | | | 717/105 |

(Continued)

FOREIGN PATENT DOCUMENTS

| | | |
|---|---|---|
| CN | 103348598 | 10/2013 |
| JP | H11-031042 | 2/1999 |
| JP | 2017/509971 | 4/2017 |

OTHER PUBLICATIONS

International Search Report and Written Opinion, PCT/US2015/020066, dated Jun. 10, 2015 (11 pages).

(Continued)

*Primary Examiner* — Greta L Robinson
(74) *Attorney, Agent, or Firm* — Fish & Richardson P.C.

(57) ABSTRACT

Methods, systems, and apparatus, including computer programs encoded on computer storage media, for specifying logical rules, one of the methods includes defining a logical rule, the logical rule applying operations based on a term. The method includes defining a mapping between fields and terms, the mapping including a mapping between a field and the term. The method includes storing the logical rule in association with the term. The method also includes applying the logical rule to data identified by the first field where respective fields are assigned to respective terms.

31 Claims, 6 Drawing Sheets

(56) References Cited

U.S. PATENT DOCUMENTS

| | | | |
|---|---|---|---|
| 8,943,059 B2* | 1/2015 | Rozenwald | G06F 16/355 |
| | | | 707/737 |
| 9,317,484 B1* | 4/2016 | Ho | G06F 17/2725 |
| 10,489,360 B2 | 11/2019 | Procops et al. | |
| 2002/0078435 A1* | 6/2002 | Liu | G06Q 10/087 |
| | | | 717/121 |
| 2004/0068661 A1* | 4/2004 | Dettinger | G06F 21/6227 |
| | | | 726/1 |
| 2004/0083199 A1* | 4/2004 | Govindugari | G06F 16/215 |
| 2005/0066263 A1* | 3/2005 | Baugher | G06Q 20/40 |
| | | | 715/205 |
| 2005/0144166 A1* | 6/2005 | Chapus | G06F 16/258 |
| 2009/0006283 A1* | 1/2009 | Labrie | G06N 5/025 |
| | | | 706/12 |
| 2009/0187447 A1* | 7/2009 | Cheng | G06F 17/30241 |
| | | | 705/7.34 |
| 2010/0100220 A1 | 4/2010 | Belanger et al. | |
| 2011/0145005 A1* | 6/2011 | Cao | G06Q 10/10 |
| | | | 705/1.1 |
| 2012/0102002 A1* | 4/2012 | Sathyanarayana | |
| | | | G06F 17/30303 |
| | | | 707/687 |
| 2012/0158625 A1* | 6/2012 | Nelke | G06N 5/025 |
| | | | 706/12 |
| 2012/0323784 A1* | 12/2012 | Weinstein | G06Q 40/02 |
| | | | 705/44 |
| 2014/0114968 A1* | 4/2014 | Anderson | G06F 16/24544 |
| | | | 707/732 |
| 2014/0229456 A1* | 8/2014 | Hollifield | G06F 17/30303 |
| | | | 707/697 |
| 2014/0330791 A1* | 11/2014 | Bomhardt | G06F 17/30371 |
| | | | 707/687 |
| 2014/0330799 A1* | 11/2014 | White | G06F 16/3344 |
| | | | 707/694 |
| 2015/0261796 A1 | 9/2015 | Gould et al. | |

OTHER PUBLICATIONS

International Preliminary Report on Patentability in PCT/US2015/020066, dated Sep. 13, 2016 (7 pages).

Office Action issued in Japanese Application No. 2016-551811, dated Dec. 20, 2018 (English Translation).

AU Office Action in Australian Appln No. 2015229419, dated Oct. 21, 2019, 8 pages.

* cited by examiner

SPECIFYING AND APPLYING LOGICAL VALIDATION RULES TO DATA

BACKGROUND

This description relates to specifying and applying rules to data.

Many modern applications, including business applications, process large sets of data (i.e., "datasets"), which can be compiled from various sources. The various sources that provide data to the dataset can have different levels of data quality. To ensure that the applications function properly, an adequate level of data quality in the dataset should be monitored and/or maintained. To monitor or maintain an adequate level of data quality, the dataset can be processed by a data validation system. Such a system applies validation rules to the dataset before it is provided to the application. In some examples, the data validation system uses the results of validation rules to calculate a measure of data quality and alert an administrator of the application if the measure of data quality falls below a predetermined threshold. In other examples, the data validation system includes modules for handling data that fails one or more of the validation rules. For example, the data validation system can discard or repair data that fails one or more of the validation rules.

In general, the validation rules applied by the data validation system are defined by an user or administrator of the data validation system.

SUMMARY

In general, one innovative aspect of the subject matter described in this specification can be embodied in methods that include the actions of receiving a logical rule, the logical rule specifying one or more operations, at least one of the operations to be applied to values assigned to a term. The methods include the actions of storing the logical rule in association with the term. The methods include the actions of defining a mapping between fields and terms, the mapping including a mapping between a field and the term. The methods also include the actions of applying the logical rule to data identified by the first field where respective fields are assigned to respective terms.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The logical rule may further apply operations based on a second term; and the mapping further includes a mapping between a second field and the second term. The logical rule may include one or more validation tests, and the application of a first validation test of the one or more validation tests to the term is based on the second term. A method may further include the actions of storing the mapping between the fields in the dataset and the corresponding terms. A method may further include the actions of selecting the logical rule based on mapping between the term and the field. A method may further include the actions of presenting a list of potential logical rules based on the mapping between the term and the field.

Aspects of the disclosed system can have one or more of the following exemplary advantages. A user interface can enable a business user to identify validation rules. Logical rules can be associated with business terms in a flexible manner. Fields in a dataset can also be associated with business terms in a flexible manner. Default validation rules can be determined based on the associations. Logical rules can decrease the time spent generating custom validation rules, decrease time spend validating a data set, can offer consistency across multiple uses of the validation rule, and encourages improved quality of the validation rules themselves, along with other benefits typically associated with modular programming. As invalid data can cause poor performance in applications, pre-validating a dataset can increase the performance of application using that dataset. Modularizing validation rules can enable companies to develop work flows for developing, testing and promoting those rules into production. Additionally, as those validation rules are improved and changed, they can be changed in single place, thus improving maintainability of these rules. Consistent rules can improve the data quality Other features and advantages of the invention will become apparent from the following description and the claims.

DESCRIPTION

Data processing systems accept data from different sources and produce outputs based on the data. The data processed by the system can include anomalies, errors, or issues. These data quality problems can be due to, for example, errors caused by inaccurate entry, such as typographical errors, machine failures, such as data corruption, and errors caused by translation errors, such as an incorrect identification of the encoding of the data. Errors can also be due to missing or unreported data, improperly formatted data, change in specification at data producer that results in misinterpreted data at data consumer, errors in reference code sets resulting in mismatches with data, synchronization problems (e.g., new reference data fails to appear on time and source data does not match older reference data), introduction of new code values, etc. In general, a goal of a data quality system is to detect issues in the data that need to be measured, sometimes as part of a data improvement program (a program designed to facilitate the number of data quality issues to go down over time).

Data validation is the process of measuring the data quality. In general, one or more data validation tests are executed against a data source. Quality of the data is quantified and, if necessary, action can be taken to improve the quality of the data.

A user interface can simplify the process of creating a validation rule. In general, a validation rule is a set of one or more validation tests that can be applied to data to determine the data quality. For example, a validation rule may include a validation test that determines whether a field of data is of a particular data type and a validation test that determines whether a field of data is of a particular size. One useful reference point is a system for editing and compiling logical rules is described in U.S. Pat. No. 8,069,129, entitled "EDITING AND COMPILING LOGICAL RULES" and filed Apr. 10, 2007, the contents of which are incorporated by reference, specifically columns 6 through 21. The systems, methods, and mediums described herein have at least some of the following advantages over the prior art. A user interface can enable a business user to identify validation rules. Logical rules can be associated with business terms. Fields in a dataset can also be associated with business terms. Default validation rules can be determined based on the associations. Logical rules can decrease the time spent validating a data set. Validating a dataset can increase the performance of application using that dataset. Another useful reference point is a system for specifying and applying rules to data is described in U.S. patent application Ser. No. 13/653,995, entitled "SPECIFYING AND APPLYING RULES TO DATA" and filed Oct. 17, 2012. A business term represents a concept that is embodied in the data. For example, a relational database table named "cust_tbl" may include a field named "phone_no." A row in the "cust_tbl" with a value in the "phone_no" field represents that a customer exists with that particular phone number. In this example, "customer" is a business term embodied in, at least, the "cust_tbl" and "phone number" is a business term embodied in the "phone_no" field. A validation rule can be constructed using business terms and concepts and subsequently applied to the data. In this manner, a business user can construct logical rules with little or no assistance from a computer expert.

Figure 1:
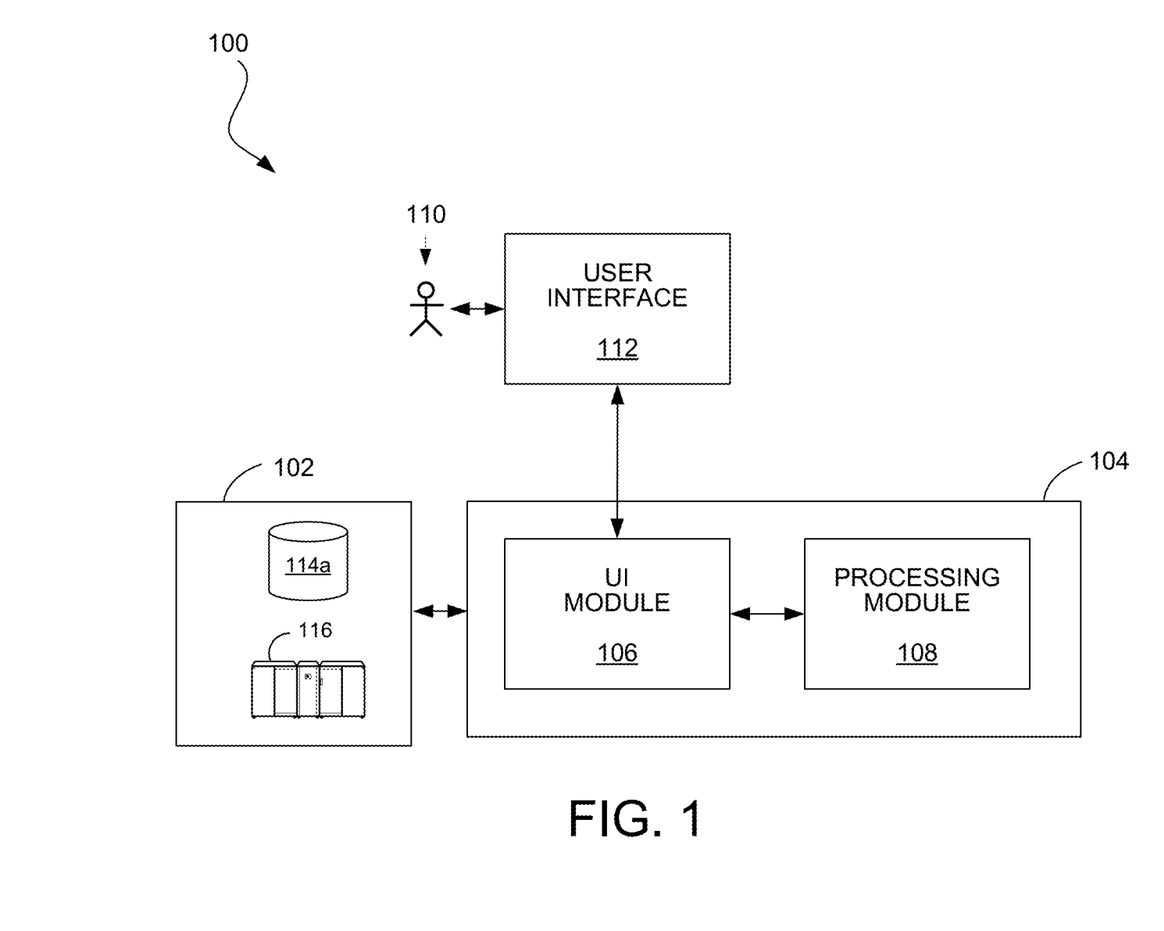
FIG. 1 is a block diagram of a system for specifying validation rules for validating data.
Figure 2:
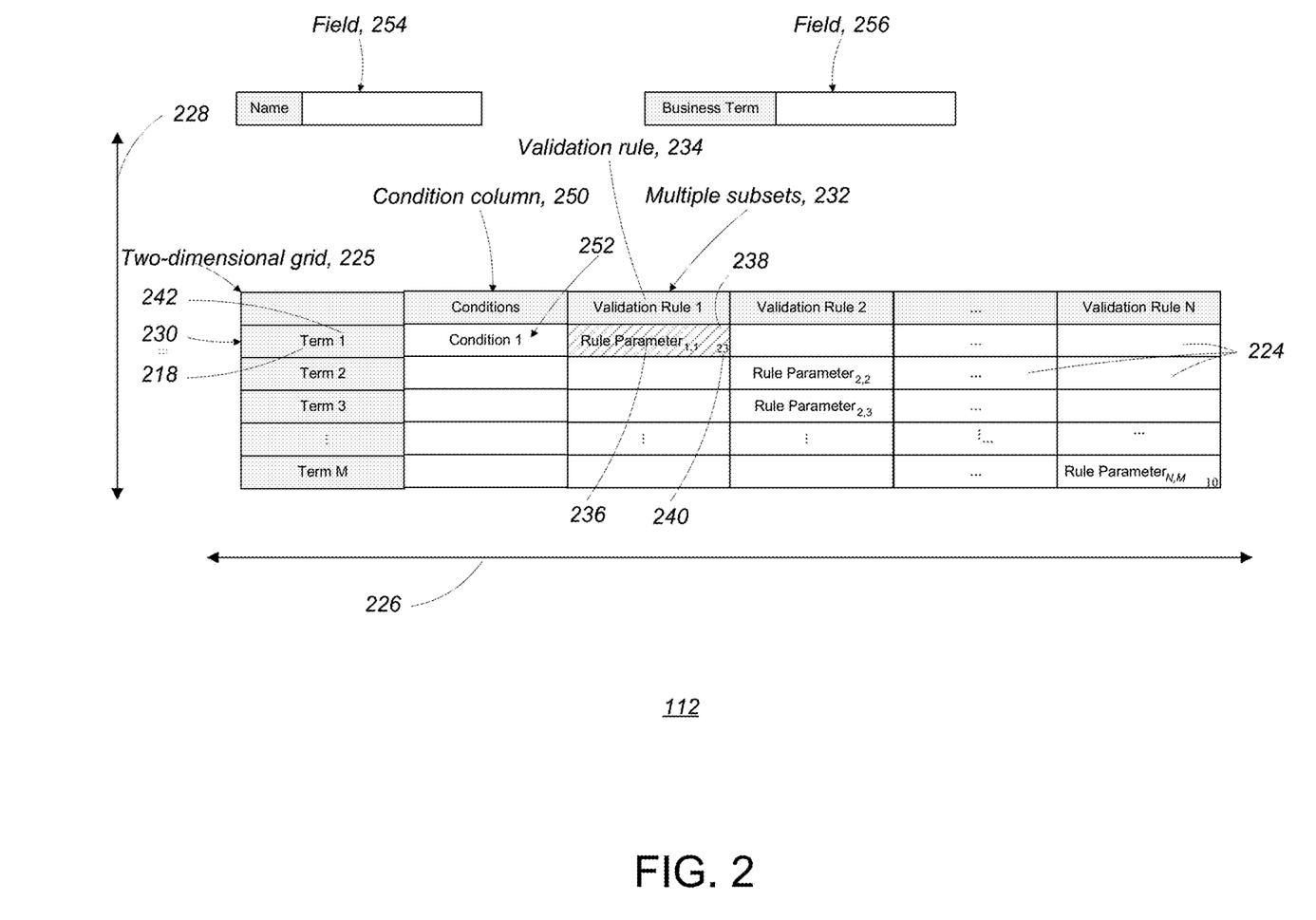
FIG. 2 is an example of a user interface for specifying logical rules for validating data.
Figure 3A:
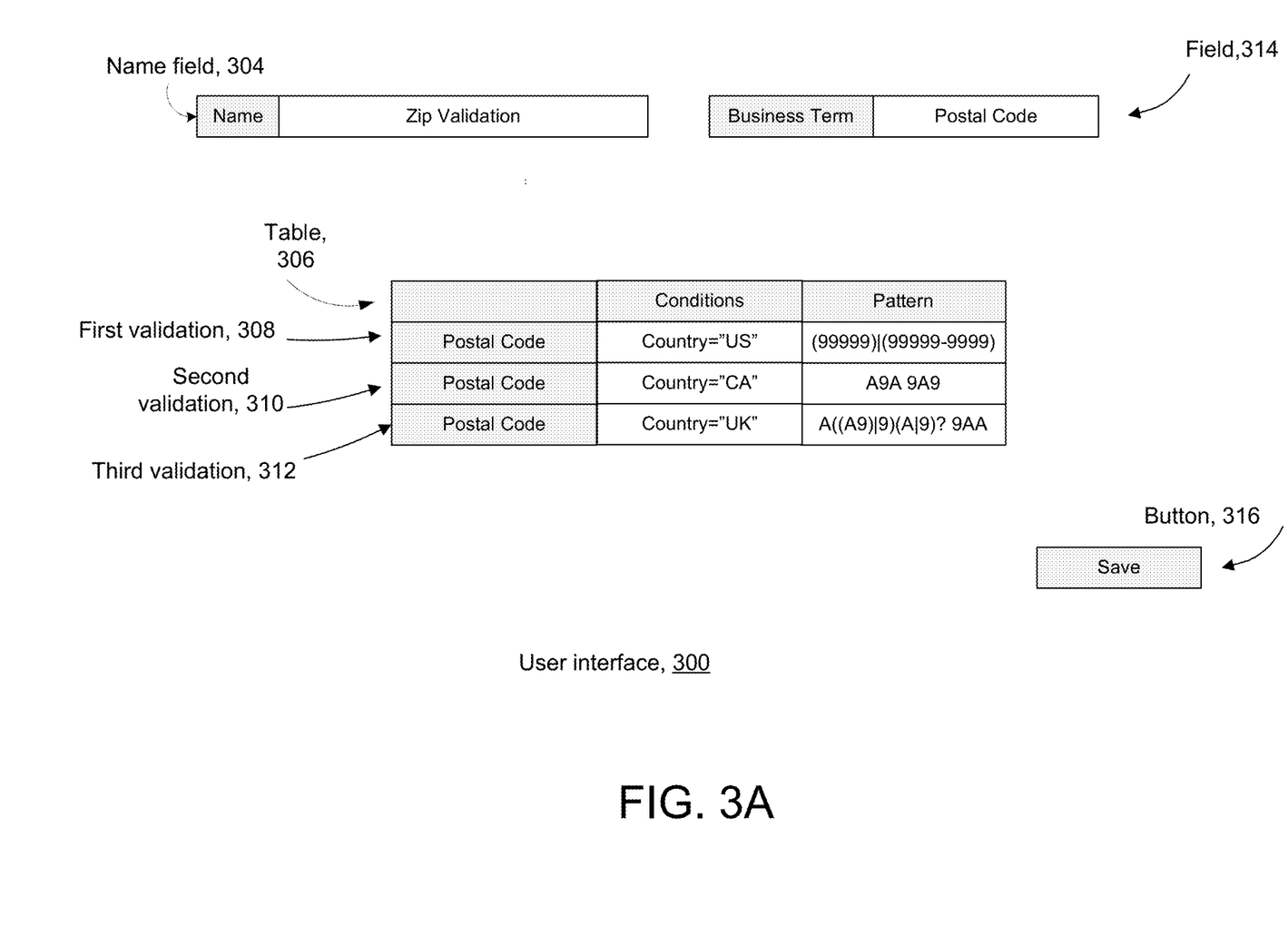
FIG. 3A-B illustrate examples of creating a logical rule.
Figure 3B:
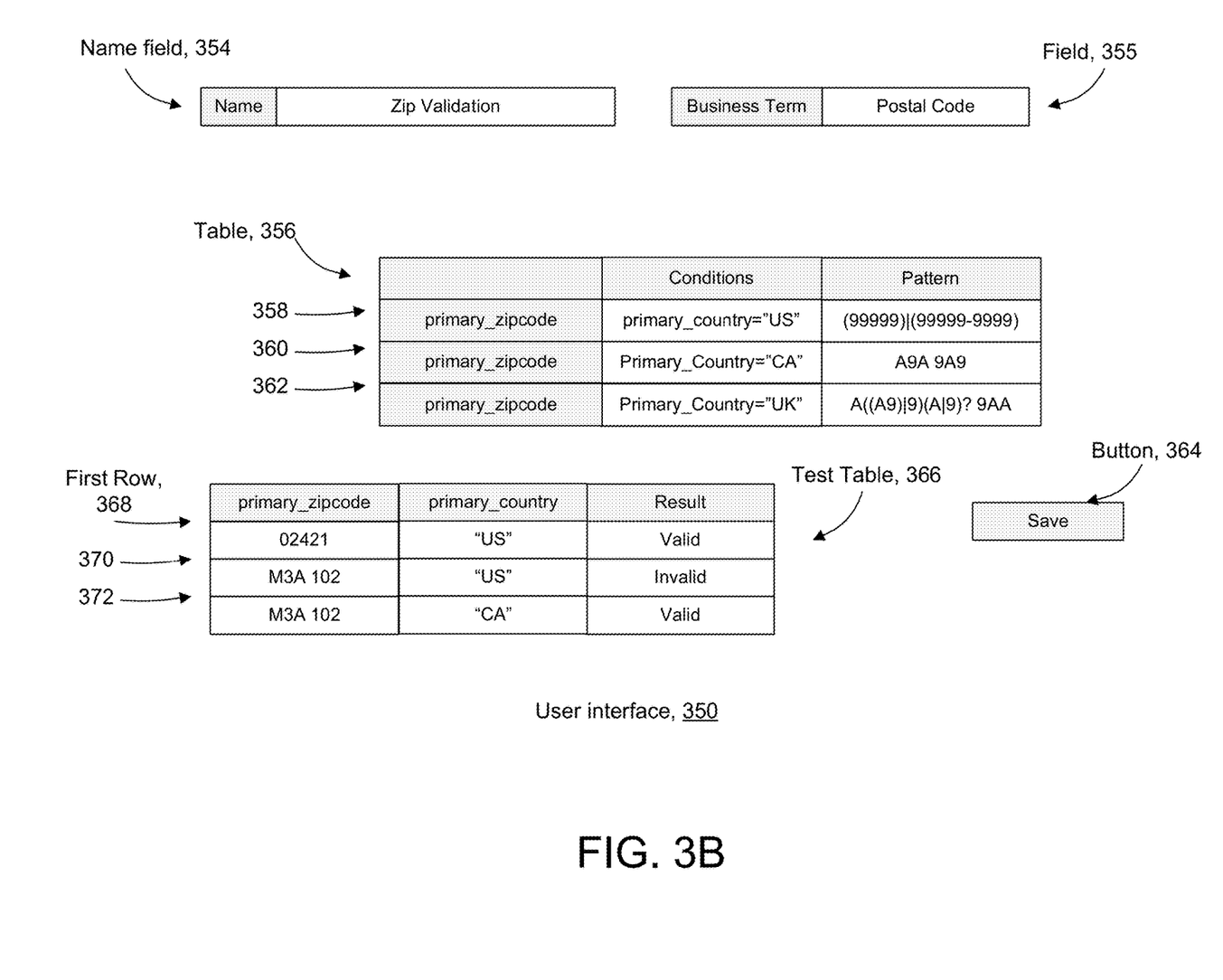
Figure 4:
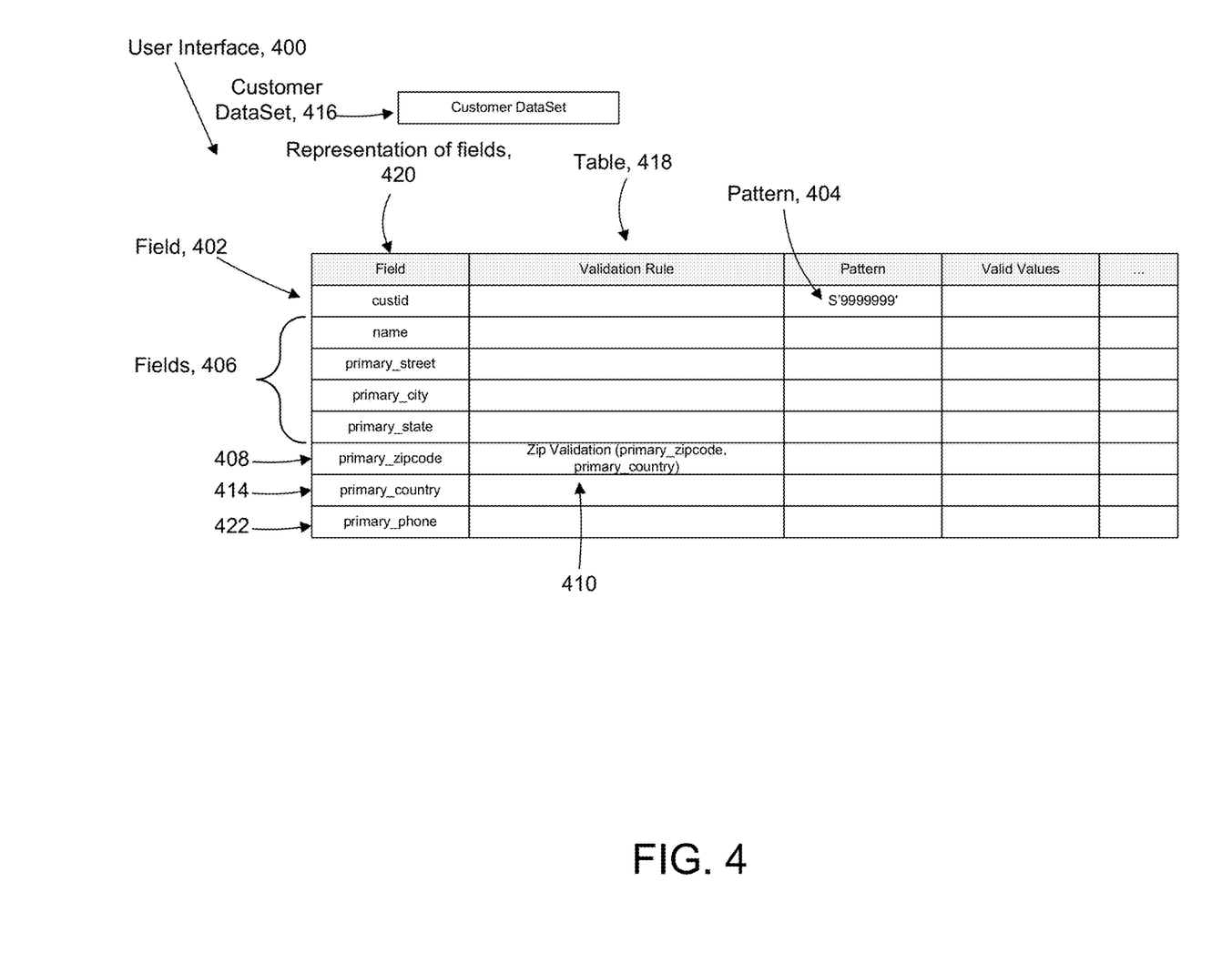
FIG. 4 illustrates an example user interface for assigning a logical rule to a field.
Figure 5:
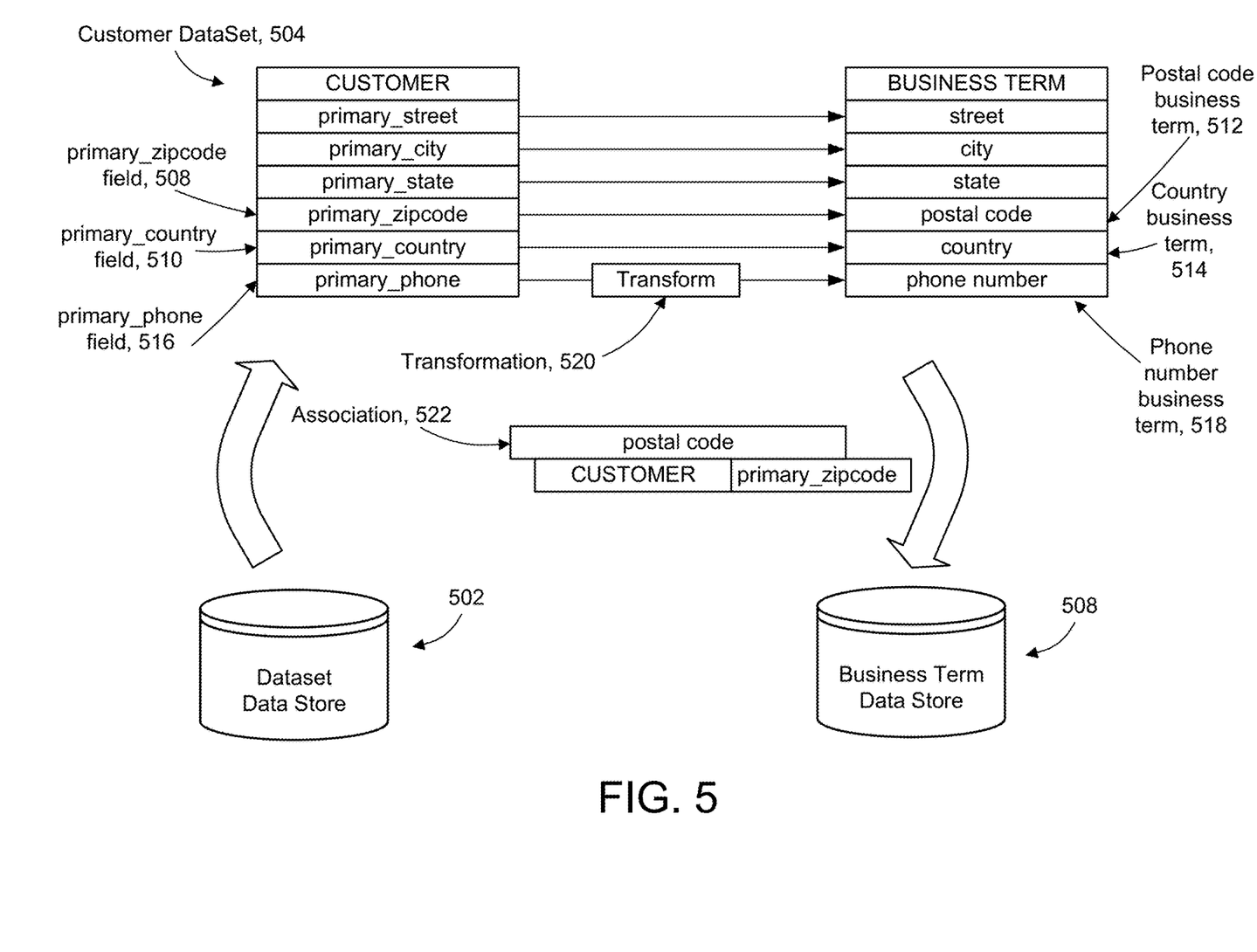
FIG. 5 is a conceptual diagram illustrating the mapping of fields in a dataset to business terms.

In general, a system, for example the system shown in FIG. 1, can be used to specify logical validation rules. FIG. 2 illustrates an example of a user interface that can be used to specify logical validation rules. FIGS. 3A and 3B provide concrete examples of logical rules. FIG. 3A illustrates a logical validation rule generated entirely with respect to business terms. FIG. 3B illustrates a logical validation rule generated using data in a dataset and then generalized into a logical rule. FIG. 3B further displays test data from the dataset during the creation of the logical validation rule. Once a logical validation rule is defined, the rule can be applied to various data sets. FIG. 4. illustrates an example user interface for applying a logical validation rule to a data set. In some implementations, fields in a dataset may be mapped to business terms so that logical validation rules may be selected automatically by a computer system. FIG. 5 is a conceptual illustration of how fields in a dataset may be mapped to business terms.

FIG. 1 shows an exemplary data processing system 100 in which validation techniques can be used. The system 100 includes a data source 102. The data source 102 can include one or more sources of data such as storage devices or connections to online data streams, each of which can store data (sometimes referred to as a "dataset") in any of a variety of storage formats (e.g., database tables, spreadsheet files, flat text files, or a native format used by a mainframe).

The execution environment 104 can be hosted on one or more general-purpose computers under the control of a suitable operating system, such as UNIX. For example, the execution environment 104 can include a multiple-node parallel computing environment: this can include configuration of computer systems using multiple central processing units (CPUs); either local (e.g., multiprocessor systems such as SMP computers) or locally distributed processors (e.g., multiple processors coupled as clusters or MPPs); remote or remotely distributed processors (e.g., multiple processors coupled via a local area network (LAN) and/or wide-area network (WAN)); or any combination thereof.

The execution environment includes a user interface (UI) module 106 and a processing module 108. The UI module 106 manages input received from a user 110 over a user interface 112 (e.g., a graphical view on a display screen) which is utilized in specifying logical rules. The logical rule may be, for example, a validation rule defined with respect to business terms. The logical rules can be used by the processing module 108 for processing data from the data source 102. The UI module 106 can also manage input received from a user 110 over a user interface 112 which is utilized in mapping fields in a dataset to business terms identified.

The processing module 108 reads data from the data source 102 and performs validation procedures based on validation information obtained by the UI module 106. Storage devices providing the data source 102 can be local to the execution environment 104, for example, being stored on a storage medium connected to a computer running the execution environment 104 (e.g., hard drive 114). Alternatively or additionally, the storage devices can be remote to the execution environment 104, for example, being hosted on a remote system (e.g., mainframe 116) in communication with a computer running the execution environment 104, over a remote connection.

In general, a dataset accessed from the data source 102 includes a number of data elements, which can be records formatted according to a predetermined record structure, or rows in a database table. Each data element can include values for a number of fields, for example, attributes defined within a record structure or columns in a database table, possibly including null or empty values. Various characteristics of values in the fields or the presence or absence of values in certain fields can be considered valid or invalid. For example, a "last_name" field including the string "Smith" may be considered valid, while a "last_name" field that is blank may be considered invalid. The conditions that determine whether a field is valid or invalid can be different for different fields. For example, a "middle_name" field including the string "Randolf" may be considered valid and a "middle_name" field that is blank may also be considered valid.

In general, fields in a dataset can represent a physical representation of a logical rule. For example, a "first_name" field (which may for example, be a variable-length character string stored in a relational database) in a "customer" data set may include data that is the first name of a customer and therefore is associated with a business term "first name." That is, the character string "John" in the "first_name" field of a data element of the customer data set represents the existence of a business customer with the given name "John." Other datasets may represent the same business concept in different ways. For example, a second dataset can include the field "fname" which may also correspond to the business term "first name."

A logical rule can be defined for business terms. For example, a validation rule can be constructed to validate that the field associated with the business term "first name" is an alphabetical string. The logical rule may then be used to validate the "first_name" field and the "frame" field.

The performance of an application that utilizes the dataset from a data source 102 can be adversely affected if the dataset includes a significant number of invalid fields. The processing module 108 performs data validation procedures, including applying data validation rules to the dataset, to ensure that the dataset meets a quality constraint. The data processing system 100 alerts a system administrator if the quality of the dataset fails to meet the quality constraint. In some arrangements, the processing module 108 can be configured to repair invalid data, if possible, or perform various data cleansing procedures to generate a dataset of cleansed data elements. The processing module 108 can be configured to generate a list of fields that include invalid data from which reports can be generated. These reports can include a count of records that include invalid data for one or more of the fields in the list of fields. The reports can also include aggregations of invalid fields are calculated from the list of fields.

In general, different applications process different types of data. Thus, depending on the application, the elements of the dataset can include different fields. The UI module 106 provides the user interface 112, which enables a set of validation rules to be specified and used to validate the dataset. The user interface 112 is able to provide a single view which includes multiple fields of a particular data element structure (in some implementations, all the available fields). Thus, for a given application, the user 110 (e.g., a system administrator) is able to specify appropriate validation rules for the data.

FIG. 2 is an example of a user interface 112 for specifying logical rulelogical rules for validating data. The user interface 112 is configured to facilitate the user 110 specifying and verifying one or more logical rulelogical rules. In this example, a logical rulelogical rule may include one or more validation tests, each of the validation tests may require the application of another validation rule. Each of the validation tests and corresponding rules can be applied to a business term.

The UI module 106 renders the user interface 112. The user interface 112 may be rendered, for example, on a computer monitor. The user interface 112 includes a number of cells 224 arranged in a two-dimensional grid 225 with a first axis 226 and a second axis 228. One or more subsets 230 of the cells 224, (referred to as rows 230 in the remainder of the detailed description) extends in a direction along the first axis 226 of the two-dimensional grid 225. Each of the rows 230 is associated with a field 218. In some arrangements, the first (i.e., leftmost) cell of each of the rows 230 includes the name of the business term 218 associated with the row 230. In this example, the first cells of each row include the business term names "Term 1," "Term 2," . . . "Term M."

Multiple subsets 232 of the cells 224 (referred to as columns 232 in the remainder of the detailed description) extend along the second axis 228. One or more of the columns 232 is associated with a validation rule 234. The columns 232 can include a "conditions" column 250 that identifies circumstances under which the validations rules associated with the business term (identified by the row) are applied. In some examples, the first (i.e., topmost) cell of each of the remaining columns 232 includes the name of the validation rule 234 associated with the column. In this example, the validation rule names are "Validation Rule 1," "Validation Rule 2," . . . "Validation Rule N." It is noted that in some examples, the directions of the first axis 226 and the second axis 228 can be swapped, causing the rows 230 associated with the fields 218 to become columns and the columns 232 associated with the validation rules 234 to become rows.

After one or more validation rule columns 232 are added to the two-dimensional grid 225, the user 110 can specify which validation rules 234 should be applied to which business terms 218. To specify that a given validation rule 234 should be applied to a given business term 218, the user 110 first selects a cell 224 where the row 230 associated with the given business term 218 intersects with the column 232 associated with the given validation rule 234. The user 110 then enters one or more validation rule parameters 236 in an input element (e.g., a text field or check box) of the selected cell 224. Generally, the inclusion of a rule parameter 236 in a cell serves two purposes. The first purpose is to provide "configuration input" which configures the validation rule 234. The second purpose is to indicate that the given validation rule 234 should be applied to the given business term 218. It follows that if a cell 224 does not include validation rule parameters 236 (i.e., the cell is left blank), the processing module 108 does not apply the validation rule 234 associated with the cell 224 to its respective business term 218 associated with the cell 224.

Many different types of rule parameters 236 can be entered in to the cells 224. In some cases, no configuration input is needed to configure a rule, therefore the rule parameter 236 can simply be a "confirmation input" rule parameter that confirms that a corresponding validation rule is to be applied. One example of an input element for receiving a confirmation input rule parameter is a checkbox which, when checked, indicates that the validation rule 234 associated with a cell 224 should be applied to the business term 218 associated with the cell 224. Examples of different types of validation rules are presented in the following list. Each validation rule indicates whether or not the validation rule is configured by configuration input:

Integer—The Integer validation rule validates that the business term contains only integer numbers (no configuration input needed).

Invalid Values—The Invalid Values rule validates that the business term does not contain user specified invalid values (provided as configuration input).

Max Precision—The Max Precision rule validates that the business term has no more than a user specified number of digits (provided as configuration input) after the decimal point.

Maximum—The Maximum rule determines that a value is valid if the business term value is greater than a user specified value (provided as configuration input).

Maximum Length—The Maximum Length rule validates that the business term has no more than a user specified number of characters or bytes (provided as configuration input).

Minimum—The Minimum rule determines that a value is invalid if the business term is less than a user specified value (provided as configuration input).

Not Blank—The Not Blank rule determines that a value is invalid if the business term is empty or contains only blanks (no configuration input needed).

Not Null—The Not Null rule determines that a value is invalid if the business term is null (provided as configuration input needed).

Pattern—The Pattern rule validates that a string business term as the specified pattern (provided as configuration input).

Valid Values—The Valid Values rule validates that the business term contains only user specified valid values (provided as configuration input).

Valid for Type—The Valid for type rule validates that the business term data is valid for its type (no configuration input needed).

The above list of validation rules is not necessarily comprehensive.

In some examples, the user interface 112 includes an option for inserting one or more mixed validation rule columns into the two-dimensional grid 225. A mixed validation rule column allows the user 110 to specify a different validation rule for each cell (associated with a given field 218) included in the column. For example, one cell of the mixed validation rule column could include a 'Valid Values' test while another cell of the mixed validation rule column could include a 'Maximum' test. In general, the user 100 specifies a validation rule for a given cell of the mixed validation rule column by entering the name of the test followed by the rule parameters for the test (if the test accepts rule parameters). In general, any validation rule which can be added to the two-dimensional grid 225 as a column can be entered into a single cell of a mixed validation rule column. "Not Null," "Maximum(99)," and "Valid Values(M,F)" are example contents of cells that can be found in the mixed validation rule column.

One advantage provided by the mixed validation rule column is that the usability of the user interface 112 is improved by more efficiently representing rarely used tests on the screen. In particular, the user 110 does not have to devote an entire column 232 of the two-dimensional grid 225 to a validation rule that only applies to a single field 218. For example, the mixed validation rule column can avoid a situation where a "Valid Email" test applies only to a single field 218 (e.g., an 'email_addr' field) but occupies an entire column 232 of the two-dimensional grid 225, thereby wasting valuable screen space.

As was mentioned above, the user 110 may desire a validation rule with functionality that is not included in any of the pre-defined validation rules. In some arrangements, the user 110 can augment the list of pre-defined validation rules with a new, reusable, custom validation rule 234. The user interface 112 provides a template for the user 110 to define the functionality of the new validation rule 234. The user 110 defines the desired custom functionality within the bounds of the template using, for example, a programming language or an expression language, such as DML code decorated with structured comments. In general, the creation of a customized validation rule requires software instruction for performing the validation test on a string-like input, a numeric-like input, a data-like input, and a datetime-like input. The customized validation rule also requires a name, a description, and a list of parameters that are needed for the custom validation rule, include the name of the parameter, the data type of the parameter, and the position of the parameter. The customized validation rule can also require a list of errors codes that may be generated by the customized validation rule. Upon saving the new validation rule 234, the validation rule 234 is added to the list, or other data structure such as a hierarchical data structure, of pre-defined validation rules. In some implementations, a user can define the hierarchical data structure and place the new validation rule within the structure for later access.

The user 110 can later use the new custom validation rule 234, for example, by dragging the validation rule from the list of validation rules into the two-dimensional grid 225 or by double-clicking the validation rule along with other methods of utilization. As is the case with the pre-defined validation rules, dragging the new validation rule into the grid 225 or double-clicking the new validation rule causes a new column 232 to be added to the grid 225, the new column 232 being associated with the new validation rule.

Validation rules, whether pre-defined or custom validation rules, can have an attribute indicating whether the rule should be applied to null values or blank values. If the rules specifies it should not be applied to null values, the value is first tested for null, and then if null the rule is not applied, or if not null the rule is applied. If the rule specifies it should not be applied to blank values, the value is first tested to see if it is blank, and the rule is only applied if the value was found to be not blank.

Validation rules, whether pre-defined or custom, can have attributes indicating logic that can be used to determine whether a set of rule parameters 236 entered in a cell 224 is valid for the validation rule. For example, the user interface 112 can determine if each set of rule parameters 236 entered in a cell 224 is correct. If the rule parameters are determined to be incorrect (for example, due to a syntax error), and an indicator (for example a red stop sign) is displayed in the cell, and an error message determined by the logic is displayed (for example in a list of errors, or as a tooltip when hovering over the cell). Another example of checking the correctness of a rule parameter is checking semantics, such as checking that a specified lookup file identifier has in fact been made known to the processing module 108.

In some cases, whether a value assigned to a particular business term is valid can depend upon another business term. For example, the valid format of postal codes and zip codes or telephone numbers can be different depending on the country. Rows that are applied when a business term has a particular value, or based on some other criteria, increases the flexibility of the reusable logical rule.

In some arrangements, the user interface 112 includes a condition column 250 that allows the user to establish a pre-condition for testing the validation rules for a given row. For example, the user may specify that "Condition 1" 252 should be met before applying "Validation Rule 1" with Rule Parameters$_{1,1}$ 236 to the business term "Term 1" 230.

As described above, the condition can refer to a business term that may or may not be the subject of the validation. For example, the condition may require that a business term have a value that matches a predetermined value, is included in a range or set of possible values, or matches a provided regular expression. The condition can require that a business term have a value (for example, the business term does not include a null value indicator.)

In some implementations, conditions can be data driven. For example, record of a certain type, accounts in a certain range, countries in a set of values. The conditions may involve lookup files or referencing data in another input file or database table.

Once the user has defined the logical rule, the user can wish to store the rule for later access. In general, the easier it is to find the logical rule after the rule has been stored the more likely it is that the rule will be re-used. In order to facilitate the reuse of the validation rule, the rule can be identified by a label or name and also can be associated with a particular business term.

In some arrangements, the user interface 112 can include a field 254 where a user can specify a name for the logical rule. The user interface 112 can also include a field 256 where the user can specify a primary business term to associate with the logical rule. In some arrangements, the field 256 can be prepopulated with the business term 218 identified in the first row 230 of the user interface.

The logical rule can be stored in a repository or other data store.

FIG. 3A and FIG. 3B illustrates examples of two approaches to defining logical rules. In the first example (FIG. 3A) a logical rule is defined without reference to a particular dataset. In the second example (FIG. 3B), the logical rule is defined with using data from an existing data set as a model.

FIG. 3A illustrates an example of generating a logical rule. A user interface 300, which can be, for example, the user interface 212 of FIG. 2, includes a name field 304. Here, the name field 304 has been populated with the name "Zip Validation." The logical rule has been associated with the business term "Postal Code", as illustrated by the field 314.

A table 306 defines the validation rules for the "postal code" business term. The reusable cross country postal code validation rule includes three conditional validations. The first validation 308 indicates that if the country is "US" then the postal code must be of the format "(99999)|(99999-9999)." The second validation 310 indicates that if the country is "CA" then the postal code must be of the format "A9A 9A9." The third validation 312 indicates that if the country is "UK" then the postal code must be of the format "A((A9)|9)(A|9)? 9AA."

The logical rule can accept data values as input. In some arrangements, the system can determine the necessary data from the validation rules. Here, the system can determine that the logical rule requires values assigned to the business term "Postal Code" and the business term "Country." In other arrangements, the system can accept a list of required data values from the user interface (not shown.)

In general, a user can populate the table 306 with the desired conditions and validations. When the user is satisfied with the validation rule, the user can save the rule to a data repository. This can be done, by clicking the "Save" button 316, or through another similar mechanism such as a menu selection or other similar action.

As discussed above, the logical rule can be stored in a repository or other data store. A user interface can access the repository and identify relevant reusable business validation rules automatically or in conjunction with user input.

Referring to FIG. 3B, in some implementations, the logical rule can be defined in reference to an existing data set. For example, a "CustomerDataSet" may include the "custid", "name", "primary_street", "primary_city", "primary_state", "primary_zipcode", "primary_country.", and "primary_phone." The user interface 350 allows the user to create the logical rule by referencing the primary_zipcode field (not shown). The user interface 350 includes a name field 354. Here, the name field 354 has been populated with the name "Zip Validation." The logical rule has been associated with the business term "Postal Code", as illustrated by the field 355.

A table 356 defines the validation rules for the "primary_zipcode." The reusable cross country postal code validation rule includes three conditional validations. The first validation 358 indicates that if the value in the primary_country field is "US" then the postal code must be of the format "(99999)|(99999-9999)." The second validation 360 indicates that if the value in the primary_country field is "CA" then the postal code must be of the format "A9A 9A9." The third validation 362 indicates that if the value in the primary_country field is "UK" then the postal code must be of the format "A((A9)|9)(A|9)? 9AA."

In general, a user can populate the table 356 with the desired conditions and validations. When the user is satisfied with the validation rule, the user can save the rule to a data repository. This can be done, by clicking the "Save" button 364, or through another similar mechanism such as a menu selection or other similar action. At the time the user saves the validation rule, the user is given the option to assign business terms to each field identified in the table 356. For example, the user may assign the business term "Postal Code" to the "primary_zipcode" field and the business term "Country" to the "primary_country" field.

As discussed above, the logical rule can be stored in a repository or other data store. A user interface can access the repository and identify relevant reusable business validation rules automatically or in conjunction with user input.

Building logical rules in this manner has the advantage of enabling the user to leverage test data to validate the logical rule. For example, the test table 366 shows data values for records in the "CustomerDataSet" as well as the resulting validation. For example, a first row 368 includes a primary_zipcode of "02421" and a primary_country of "US." Based on the first validation 358 in the table 356, the user interface 350 displays that the first row 368 is valid. A second row 370 includes a primary_zipcode of "M3A 102" and a primary_country of "US." Because the combination of primary_zipcode and primary_country do not match any validation in the table 356, the user interface 350 displays that the second row 370 is invalid. A third row 372 includes a primary_zipcode of "M3A 102" and a primary_country of "CA." Based on the third validation 362 in the table 356, the user interface 350 displays that the third row 370 is valid.

FIG. 4 illustrates an example of a user interface 400 that can be used for assigning a logical rule to a field. The user interface 400 can display fields for a dataset. The dataset can be selected from among different datasets stored in one or more data stores. The dataset can be, for example, a table in a relational database, a flat file, or other data structure. In this example, the "Customer DataSet" 416 has been selected.

The user interface 400 includes a table 418 that displays a representation of fields 420 in the selected dataset. The "Customer DataSet" includes the fields "custid" 402, "name", "primary_street", "primary_city", "primary_state" (collectively labeled 406), "primary_zipcode" 408, "primary_country." 414, and "primary_phone" 422.

The user interface 400 enables a user to provide a custom validation rule for the field. Here, the "custid" field 402 is associated with a validation rule requiring that the value of the "custid" field 402 match a pattern S'9999999' 404. The user interface 400 also enables a user to select a logical rule 418. In this example, the "primary_zipcode" 408 has been associated with the Zip Validation rule 410. The zip validation rule 410, as defined above in reference to FIG. 3, is provided with the "primary_country" as a parameter. The assigned values correspond to the "Country" business term, respectively.

As discussed above, in order to simplify the application of useable validation rules to a dataset, a user may wish to map the fields in the dataset to business terms. FIG. 5 is a conceptual diagrapm illustrating an example of mapping fields in a dataset to business terms. A mapping establishes a relationship between a field in a dataset and a business term. In general, one or more fields can be mapped to a business term. The mapping can specify that the fields are concatenated or otherwise combined to create the business term. In some arrangements, a transformation can be specified to alter the values stored in the dataset into a standard business format.

A data store 502 includes datasets. In this example, the data store includes a "Customer DataSet" 504. The "Customer DataSet" 504 includes fields including a primary_zipcode field 508, a primary_country field 510, and a primary_phone field 516. The fields in the dataset can be mapped to pre-existing business terms. For example, the primary_zipcode field 508 can be mapped to the postal code business term 512. The primary_country field 510 can be mapped to the country business term 514. The primary_phone field 516 can be mapped to the phone number business term 518.

In some arrangements, a transformation can be specified as part of mapping a field to a business term. The transformation can be used to convert data from one format to another. A telephone number could be stored in the format "(999) 999-9999", "999-999-9999" or the area code, prefix, and suffix could be stored in three separate fields. Here, the primary_phone field 516 may store the phone number in the format "(999) 999-9999" Functions that use the phone number business term can expect that the data to be formatted in a particular way (i.e. the standard business format), such as, "999-999-9999." The transformation 520 defines the function to transform the data into the standard business format.

Once an association between the business term and the field is established, the association can be stored in a business term data store 508. For example, association 522 illustrates that the primary_zipcode field of the "Customer DataSet" maps to the postal code business term. The system can use the mapping of fields to business terms in order to automatically identify logical rules for particular fields and to identify inputs to the identified logical rule. If a field in a dataset is associated with a business term, the system can identify logical rules that are associated with the same business term. The system can then assign the identified validation rule to the field. For example, referring to FIG. 4, the system might identify that the primary_zipcode field is associated with the postal code business term. The system could also identify that the Zip Validation rule is associated with the postal code business term. Consequently, the system can associate the Zip Validation rule with the primary_zipcode field in the user interface 400.

The system can also use the mapping to identify the inputs to the selected validation rule. The system could, for example, identify that the Zip Validation rule requires a postal code business term and a country business term as inputs. Here, the system would identify that the primary_zipcode field of the "Customer DataSet" is associated with the postal code business term and that the primary_country field of the "Customer DataSet" is associated with the country business term. In response, the system automatically assigns the primary_zipcode and the primary_country to the parameters of the Zip Validation rule.

In some arrangements, if the system determines that multiple logical rules are associated with a business term, the user interface can present the user with a list from which to select the appropriate validation rule.

In some arrangements, the user can be provided with the opportunity to review and modify the validation rule and inputs selected by the system. In scenarios where the user elects to modify the selected validation rule, for example, by selecting an alternate rule, the system can identify the fields to be provided as inputs, as described above.

If the user is satisfied with the select logical rule and inputs, the user can save the validation selections.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software can be provided on a storage medium, such as a CD-ROM, readable by a general or special purpose programmable computer, or delivered (encoded in a propagated signal) over a communication medium of a network to a storage medium of the computer where it is executed. All of the functions can be performed on a special purpose computer, or using special-purpose hardware, such as coprocessors. The software can be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system can also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications can be made without departing from the spirit and scope of the invention. For example, some of the steps described above can be order independent, and thus can be performed in an order different from that described.

It is to be understood that the foregoing description is intended to illustrate and not to limit the scope of the invention, which is defined by the scope of the appended claims. For example, a number of the function steps described above can be performed in a different order without substantially affecting overall processing. Other embodiments are within the scope of the following claims.

What is claimed is:

1. A computer-implemented method for specifying logical validation rules, the method including:
generating by a data processing system, one or more logical validation rules including a table having one or more term fields populated with one or more business terms, the one or more logical validation rules specifying one or more operations to be applied to one or more values of one or more fields of structured data records in a dataset, by:
populating the one or more term fields of the one or more logical validation rules with one or more business terms from one or more business term fields in a mapping that defines a mapping among fields in the structured data records in the dataset to the one or more business term fields; and
saving, in computer storage by the data processing system, the one or more logical validation rules, with at least some of the one or more business term fields in the mapping referencing the one or more logical validation rules;

automatically selecting at least one logical validation rule saved in computer storage by the data processing system, to process one more structured data records of the dataset, with the selecting based on the mapping among the fields in the structured data records in the dataset to the one or more business term fields; and applying the selected at least one logical validation rule to at least one value identified by the mapping.

2. The method of claim 1, wherein a business term field includes a first business term field and at least one of the one or more fields includes a first field, wherein a logical validation rule further applies operations based on a second business term field, and the mapping further includes a mapping between a second field and the second business term field.

3. The method of claim 2, wherein the logical validation rule includes one or more validation tests, and application of a first validation test of the one or more validation tests to the first business term field is based on the second business term field.

4. The method of claim 1, further including storing in memory the mapping that defines the mapping among fields in the structured data records in the dataset and the business terms fields.

5. The method of claim 1, further including
identifying, in a structured data record from an accessed dataset, a particular field mapped to a particular business term field in the mapping;
determining, that the particular business term field references the one or more logical validation rules; and
applying the selected one or more logical validation rules to at least one value of the particular field identified by the mapping.

6. The method of claim 1, further including presenting a list of potential logical rules based on the mapping among the fields in the structured data records in the dataset and business terms fields.

7. The computer-implemented method of claim 1, further including:
generating rendering data that when rendered on a display screen renders a two-dimensional grid that enables dragging a visual representation of a logical validation rule from a list of validation rules into the two-dimensional grid by adding a new column to the two-dimensional grid that is associated with the logical validation rule.

8. A computer storage medium encoded with computer program instructions that when executed by one or more computers cause the one or more computers to perform operations comprising:
saving, in computer storage, one or more logical validation rules, the one or more logical validation rules specifying one or more operations to be applied to one or more values of one or more fields of structured data records in a dataset, the one or more logical validation rules each including one or more name fields that map to one or more business term fields in a mapping that defines a mapping among fields in the structured data records in the dataset and business terms fields and that specifies one or more fields of the structured data records in the dataset that are combined to provide the business term field;
automatically selecting at least one logical validation rule by the one or more computers, to process one more structured data records of the dataset, with selecting based on the defined mapping among one or more fields in the structured data records in the dataset to one or more business term fields referenced by a name field of the at least one logical validation rule selected; and
applying the selected at least one logical validation rule to at least one value identified by the defined mapping.

9. The medium of claim 8, wherein a business term field includes a first business term field and at least one of the one or more fields includes a first field, wherein a logical validation rule further applies operations based on a second business term field, and the mapping further includes a mapping between a second field and the second business term field.

10. The medium of claim 9, wherein the logical validation rule includes one or more validation tests, and application of a first validation test of the one or more validation tests to the first business term field is based on the second business term field.

11. The medium of claim 8, further including storing in memory the mapping that defines the mapping among fields in the structured data records in the dataset and the business terms fields.

12. The medium of claim 8, further including:
identifying, in a structured data record from an accessed dataset, a particular field mapped to a particular business term field in the mapping;
determining, that the particular business term field references the one or more logical validation rules; and
applying the selected one or more logical validation rules to at least one value of the particular field identified by the mapping.

13. The medium of claim 8, further including presenting a list of potential logical validation rules based on the mapping among the fields in the structured data records in the dataset and business terms fields.

14. A system comprising:
one or more computers and one or more storage devices storing instructions that are operable, when executed by the one or more computers, to cause the one or more computers to perform operations comprising:
saving, in computer storage, one or more logical validation rules, the one or more logical validation rules specifying one or more operations to be applied to one or more values of one or more fields of structured data records in a dataset, the one or more logical validation rules each including one or more name fields that map to one or more business term fields in a mapping that defines a mapping among fields in the structured data records in the dataset and business terms fields and that specifies one or more fields of the structured data records in the dataset that are combined to provide the business term field;
automatically selecting at least one logical validation rule by the one or more computers, to process one more structured data records of the dataset according to the defined mapping among one or more fields in the structured data records in the dataset to one or more business term fields referenced by a name field of the at least one logical validation rule selected; and
applying the selected at least one logical validation rule to at least one value identified by the defined mapping.

15. The system of claim 14, wherein a business term field includes a first business term field and at least one of the one or more fields includes a first field, wherein a logical validation rule further applies operations based on a second business term field, and the mapping further includes a mapping between a second field and the second business term field.

16. The system of claim 15, wherein the logical validation rule includes one or more validation tests, and application of a first validation test of the one or more validation tests to the first business term field is based on the second business term field.

17. The system of claim 14, further including storing in memory the mapping that defines the mapping among fields in the structured data records in the dataset and the business terms fields.

18. The system of claim 14, further including
identifying, in a structured data record from an accessed dataset, a particular field mapped to a particular business term field in the mapping;
determining, that the particular business term field references the one or more logical validation rules; and
applying the selected one or more logical validation rules to at least one value of the particular field identified by the mapping.

19. The medium of claim 14, further including presenting a list of potential logical validation rules based on the mapping among the fields in the structured data records in the dataset and business terms fields.

20. A computer-implemented method for specifying logical validation rules, the method including:
receiving, in computer storage by a data processing system, one or more logical validation rules that each includes a name field that associates the logical validation rule with a business term field, with the business term field providing a reference to a mapping that defines a relationship of fields in structured data records in a dataset to business term fields in the one or more logical validation rules specifying one or more operations to be applied to one or more values of one or more fields in the dataset, with the mapping specifying one or more fields in the dataset that are combined to provide a business term field; and
selecting with the data processing system, based on the defined relationship from the mapping among the fields in the structured data records in the dataset and the business terms fields, at least one logical data validation rule to process data records of the dataset by applying the selected at least one logical validation rule to at least one value identified by the defined mapping.

21. A computer-implemented method for generating a logical validation rule, the method including:
specifying in a data processing system, one or more operations to be applied to one or more values of one or more fields in structured data records in a dataset;
referencing by the data processing system a defined mapping among fields in the dataset and business term fields, the mapping specifying one or more fields in the dataset for which one or more values in those one or more fields are combined to provide a value for one or more business term fields;
selecting a logical validation rule based on the mapping among the fields in the structured data records in the dataset and the business terms fields; and
saving, by the data processing system, the logical validation rule in one or more storage devices, the logical validation rule including the specified one or more operations, a business term field and a name field that associates the logical validation rule to the business term field.

22. A computer-implemented method including:
saving, in computer storage, one or more logical validation rules, the one or more logical validation rules specifying one or more operations to be applied to one or more values of one or more fields of structured data records in a dataset, the one or more logical validation rules each including one or more name fields that map to one or more business term fields in a mapping that defines a mapping among fields in the structured data records in the dataset and business terms fields and that specifies one or more fields of the structured data records in the dataset that are combined to provide the business term field;
automatically selecting at least one logical validation rule by the one or more computers, to process one more structured data records of the dataset, with selecting based on the defined mapping among one or more fields in the structured data records in the dataset to one or more business term fields referenced by a name field of the at least one logical validation rule selected; and
applying the selected at least one logical validation rule to at least one value identified by the defined mapping.

23. The computer-implemented method of claim 22, wherein a business term field includes a first business term field and at least one of the one or more fields includes a first field, wherein a logical validation rule further applies operations based on a second business term field, and the mapping further includes a mapping between a second field and the second business term field.

24. The computer-implemented method of claim 23, wherein the logical validation rule includes one or more validation tests, and application of a first validation test of the one or more validation tests to the first business term field is based on the second business term field.

25. The computer-implemented method of claim 22, further including storing in memory the mapping that defines the mapping among fields in the structured data records in the dataset and the business terms fields.

26. The computer-implemented method of claim 22, further including:
identifying, in a structured data record from an accessed dataset, a particular field mapped to a particular business term field in the mapping;
determining, that the particular business term field references the one or more logical validation rules; and
applying the selected one or more logical validation rules to at least one value of the particular field identified by the mapping.

27. The computer-implemented method of claim 22, further including presenting a list of potential logical validation rules based on the mapping among the fields in the structured data records in the dataset and business terms fields.

28. A computer storage medium for specifying logical validation rules, the computer storage medium encoded with computer program instructions that when executed by a data processing system causes the data processing system to perform operations comprising:
receiving, in computer storage by a data processing system, one or more logical validation rules that each includes a name field that associates the logical validation rule with a business term field, with the business term field providing a reference to a mapping that defines a relationship of fields in structured data records in a dataset to business term fields in the one or more logical validation rules specifying one or more operations to be applied to one or more values of one or more fields in the dataset, with the mapping specifying one or more fields in the dataset that are combined to provide a business term field; and selecting with the data processing system, based on the defined relationship from the mapping among the fields in the structured data records in the dataset and the business terms fields, at least one logical data validation rule to process data records of the dataset by applying the selected at least one logical validation rule to at least one value identified by the defined mapping.

29. A data processing system for specifying logical validation rules, comprising:
one or more computers and computer storage storing instructions that are operable, when executed by the one or more computers, to cause the one or more computers to perform operations comprising:
receiving, in computer storage by a data processing system, one or more logical validation rules that each includes a name field that associates the logical validation rule with a business term field, with the business term field providing a reference to a mapping that defines a relationship of fields in structured data records in a dataset to business term fields in the one or more logical validation rules specifying one or more operations to be applied to one or more values of one or more fields in the dataset, with the mapping specifying one or more fields in the dataset that are combined to provide a business term field; and
selecting with the data processing system, based on the defined relationship from the mapping among the fields in the structured data records in the dataset and the business terms fields, at least one logical data validation rule to process data records of the dataset by applying the selected at least one logical validation rule to at least one value identified by the defined mapping.

30. A computer storage medium for generating a logical validation rule, the computer storage medium encoded with computer program instructions that when executed by a data processing system causes the data processing system to perform operations comprising:
specifying in a data processing system, one or more operations to be applied to one or more values of one or more fields in structured data records in a dataset;
referencing by the data processing system a defined mapping among fields in the dataset and business term fields, the mapping specifying one or more fields in the dataset for which one or more values in those one or more fields are combined to provide a value for one or more business term fields;
selecting a logical validation rule based on the mapping among the fields in the structured data records in the dataset and the business terms fields; and
saving, by the data processing system, the logical validation rule in one or more storage devices, the logical validation rule including the specified one or more operations, a business term field and a name field that associates the logical validation rule to the business term field.

31. A data processing system for generating a logical validation rule, comprising:
one or more computers and one or more storage devices storing instructions that are operable, when executed by the one or more computers, to cause the one or more computers to perform operations comprising:
specifying in a data processing system, one or more operations to be applied to one or more values of one or more fields in structured data records in a dataset;
referencing by the data processing system a defined mapping among fields in the dataset and business term fields, the mapping specifying one or more fields in the dataset for which one or more values in those one or more fields are combined to provide a value for one or more business term fields;
selecting a logical validation rule based on the mapping among the fields in the structured data records in the dataset and the business terms fields; and
saving, by the data processing system, the logical validation rule in one or more storage devices, the logical validation rule including the specified one or more operations, a business term field and a name field that associates the logical validation rule to the business term field.

\* \* \* \* \*

UNITED STATES PATENT AND TRADEMARK OFFICE
CERTIFICATE OF CORRECTION

PATENT NO. : 10,769,122 B2
APPLICATION NO. : 14/208147
DATED : September 8, 2020
INVENTOR(S) : Joel Gould and Roy Procops Page 1 of 1

It is certified that error appears in the above-identified patent and that said Letters Patent is hereby corrected as shown below:

In the Claims

Column 15, Line 23, Claim 19, delete "medium" and insert -- system --

Signed and Sealed this
Twenty-ninth Day of December, 2020

Andrei Iancu
*Director of the United States Patent and Trademark Office*